Nov. 16, 1937.　　　　A. P. BALL　　　　2,099,189
FASTENING DEVICE FOR PANELS OR THE LIKE
Filed Dec. 29, 1934
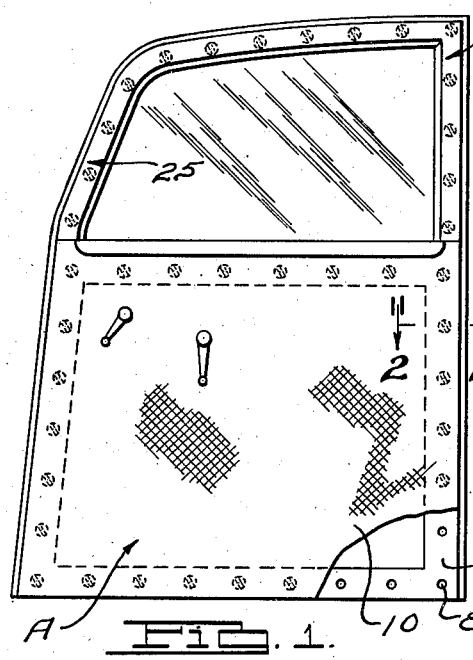
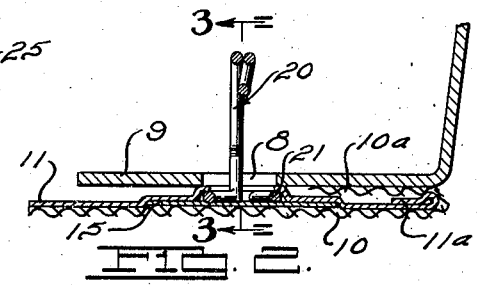
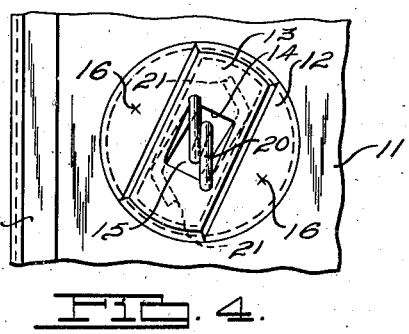
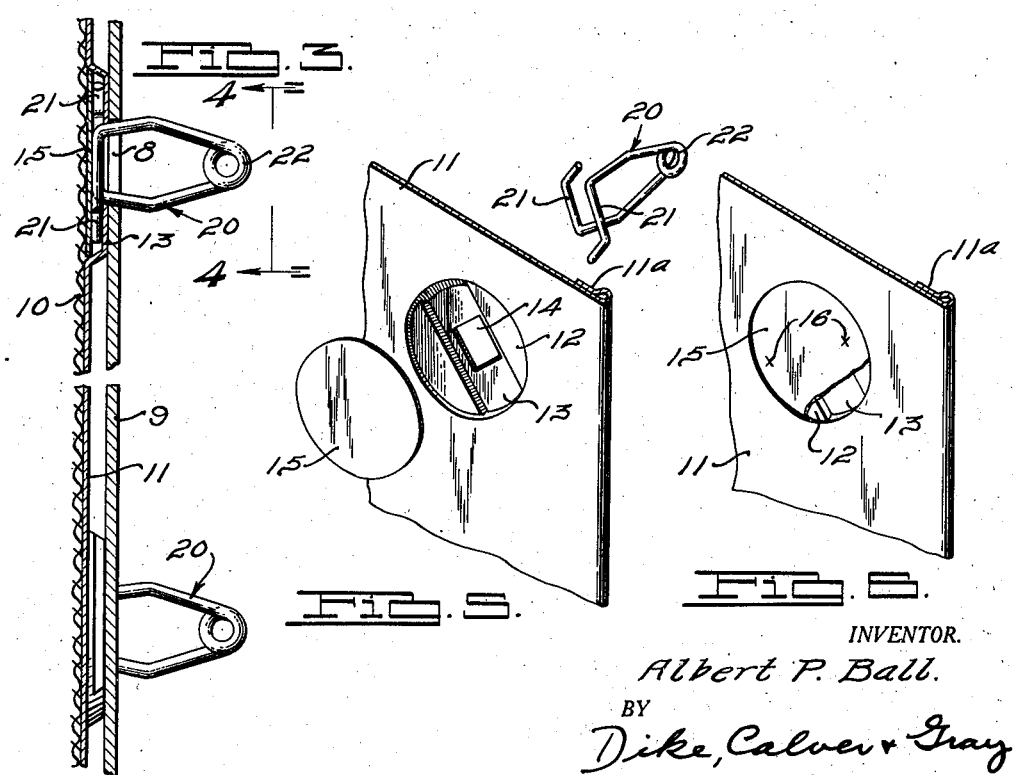
INVENTOR.
Albert P. Ball.
BY
Dike, Calver & Gray
ATTORNEYS.

Patented Nov. 16, 1937

2,099,189

UNITED STATES PATENT OFFICE 2,099,189

FASTENING DEVICE FOR PANELS OR THE LIKE

Albert P. Ball, Detroit, Mich., assignor to Briggs Manufacturing Company, Detroit, Mich., a corporation of Michigan Application December 29, 1934, Serial No. 759,615

4 Claims. (Cl. 45—138)

This invention relates in general to fastener devices of the type particularly, although not exclusively, adapted for the purpose of detachably securing interior trim parts or members of an automobile or other vehicle body to the body frame work or supporting structure for the trim members. The invention is especially useful in connection with fastener devices for moldings, trim panels and other fabric covered interior trim parts of automotive or other types of vehicle bodies and finds a wide range of use in various fields where devices of the general type herein illustrated may be utilized.

An object of the invention is to provide an improved fastener device of relatively simple construction which may be economically produced, thus rendering it of particular desirability in large scale production.

A further object of the invention is to provide a device of this character comprising a metal retainer base preferably constructed to detachably support a fastener of any preferred type, and wherein the metal retainer into which the fastener is insertable is provided with improved means for anchoring the fastener and adapted to be formed, principally by a stamping operation, in an improved, simple and economical manner.

The above and other objects and advantages of the invention will be apparent from the following description and appended claims when considered in connection with the accompanying drawing forming a part of this specification.

In said drawing:

Fig. 1 is an elevational view, partly broken away, of the inner face of a vehicle door embodying the invention.

Fig. 2 is a horizontal section, on an enlarged scale, taken substantially along the line 2—2 of Fig. 1.

Fig. 3 is a fragmentary vertical section through the door of Fig. 1, and taken substantially along the line 3—3 of Fig. 2.

Fig. 4 is a fragmentary elevation taken substantially along the line 4—4 of Fig. 3 showing one of the fastening elements and associated parts.

Fig. 5 is a fragmentary perspective view showing one of the fastener devices and associated parts disassembled; and Fig. 6 is a fragmentary perspective view, partly broken away, of the structure of Fig. 5 with the parts assembled.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the claimed invention herein beyond the requirements of the prior art.

In one aspect of the invention, herein illustrated by way of example, there is provided an improved trim panel and/or molding assembly wherein the fabric covered trim panel and molding and the door or other frame portion of the body are provided with cooperating fastener portions so constructed that the trim panel and molding, or either of them, may be readily and easily mounted upon the body or door frame work.

One of the important features of the invention is to provide an improved retainer device or panel for fasteners in which a material saving in labor is effected in placing the devices in position in the welding fixture and removing them therefrom after the spot welding operation.

In the present instance, the trim panel shown as a whole at A comprises a foundation or backing sheet 11 formed of thin sheet steel or other suitable light weight metal. The outer face of the sheet is covered by a trim fabric material 10 which is preferably folded around the edges of the metal backing sheet or retainer base 11 as shown at 10a in Fig. 2 and cemented in position so as to provide a laminated sheet. The backing sheet or trim panel 11 is preferably shaped to conform to the shape of the door or other body member or part to which it is to be applied. Around its marginal edges the trim panel 11 is provided with a plurality or series of socket members formed therein for supporting the fastener devices. Each of the sockets is formed by stamping the panel 11 to provide preferably a two-step embossment comprising a circular recess 12, an offset portion 13 and an aperture 14 formed in the latter. The embossment receives a metal plate or backing piece which, as shown, is in the form of a disk 15 adapted to overlie and to be spot welded to the embossment, as shown at 16. The disk 15 and the offset portion 13 together provide a socket to detachably receive the legs or base portions 21 of a projecting fastener member 20. This fastener may be formed from a single piece of wire bent to provide a coil 22 at its outer end or tip, said coil providing resiliency to the fastener to permit the legs 21 thereof to be compressed and passed through the aperture 14 and snapped into place within the socket, whereupon expansion of the coil will lock them in place. As seen in Fig. 3, the fasteners project through holes or openings 8 formed in the door frame or jamb 9 and serve to hold the trim panel in position upon the door against accidental displacement or removal, yet permitting its removal when and if desirable.

It is to be noted that the depth of the embossment portion 12 is substantially the same as the thickness of the disk 15 so that the outer face of the disk when in place will be substantially flush with the outer face of the sheet or strip 11. Therefore, when the trim fabric 10 is placed over the face of the metal trim panel, there will be no unsightly projections or protuberances on the trim panel.

The surrounding edges of the metal trim panel 11 may, if desired, be turned back upon the panel to provide flanges 11a having rolled or beaded edges. The rolled edges prevent damage to the folded edge of the fabric and also offset the trim panel from the support a distance sufficient to compensate for the depth of the embossments.

Referring particularly to Fig. 1 of the drawing, the upper structure of the door on its inner face is provided with fabric covered metal trim molding members, shown as a whole at 25. These members are in the form of strips of metal of slightly less width than the frame portion or reveal surrounding the window opening and are covered with fabric which is folded over the edges of the trim molding and secured thereto by cement, in the same manner as the fabric covering 10 is applied to the metal trim panel 11. The molding strips 25 are also provided with embossments which together with metal disks corresponding to the disks 15, provide socket members for spring-like fastener devices or elements similar to the devices 20.

There is a material saving in production of trim panels and moldings made in accordance with the present invention. The two-step embossment and the aperture or opening 14 are made by a single punching and stamping operation. The recesses 12 provide retainers for the disks 15 so that all of the disks may be readily placed or dropped into position in the several recesses which retain and locate them during the welding operation. Thus it is not necessary to provide jigs or fixtures for holding any of the parts for the purpose of welding since the countersunk recesses 12 in the molding or trim panel form the locating means for the disks 15, and after the disks have been located, the panel may be passed through the welding apparatus and the disks successively spot welded to the panel. Consequently considerable labor saving is effected by eliminating the necessity, as heretofore, of placing the parts to be welded in a fixture or jig.

I claim:

1. A fastener device comprising a sheet metal base having an embossment provided with an apertured offset portion, and a backing piece mounted within the embossment and forming with said offset portion a socket for receiving and supporting a projecting fastener.

2. A retainer member for a fastener comprising a metal base having a circular embossment provided with an outwardly offset portion apertured to receive a fastener element, and a metal backing disk fitting into the embossment.

3. A retainer member for a fastener comprising a metal base having a circular embossment provided with an outwardly offset portion apertured to receive a fastener element, and a metal backing disk fitting within and attached to said embossment.

4. A retainer member for a fastener comprising a metal base having a circular embossment provided with an outwardly offset portion apertured to receive a fastener element, and a metal backing piece fitting within the embossment and lying substantially flush with said metal base.

ALBERT P. BALL.